Feb. 24, 1959     B. J. BOYKIN     2,874,402
FOWL DEHEADING APPARATUS

Filed Jan. 3, 1958     4 Sheets-Sheet 1

INVENTOR
Benjamin J. Boykin,

BY
McMorrow, Berman & Davidson
ATTORNEYS

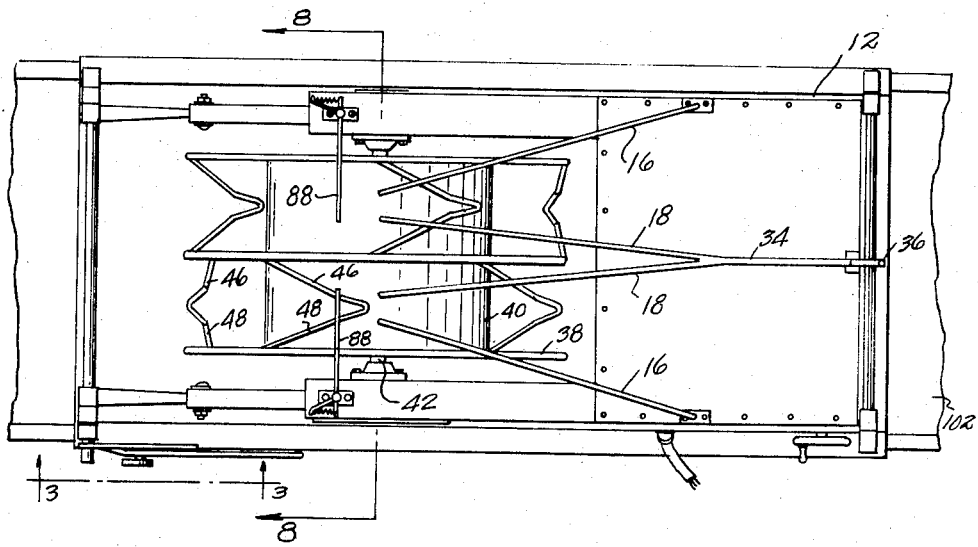
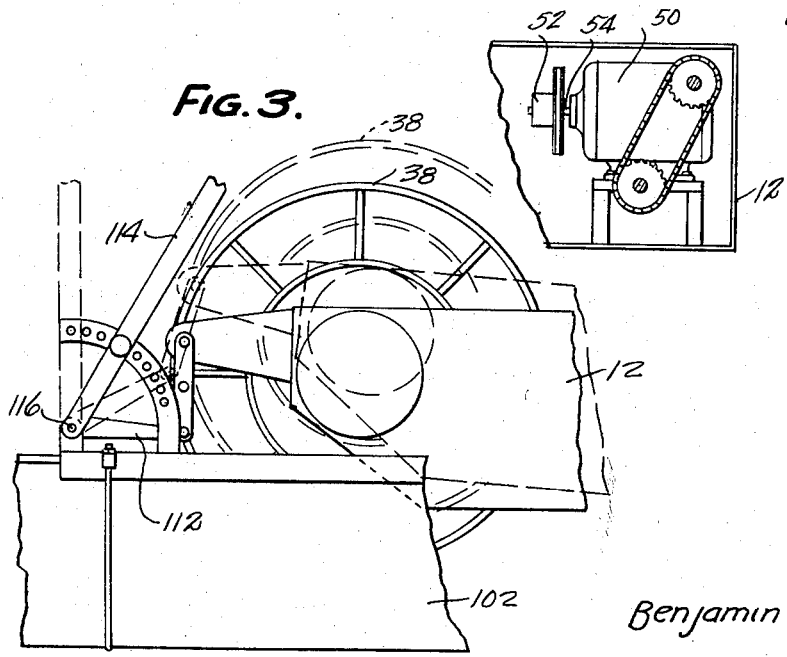

Feb. 24, 1959
B. J. BOYKIN
2,874,402
FOWL DEHEADING APPARATUS
Filed Jan. 3, 1958
4 Sheets-Sheet 3
FIG. 4.
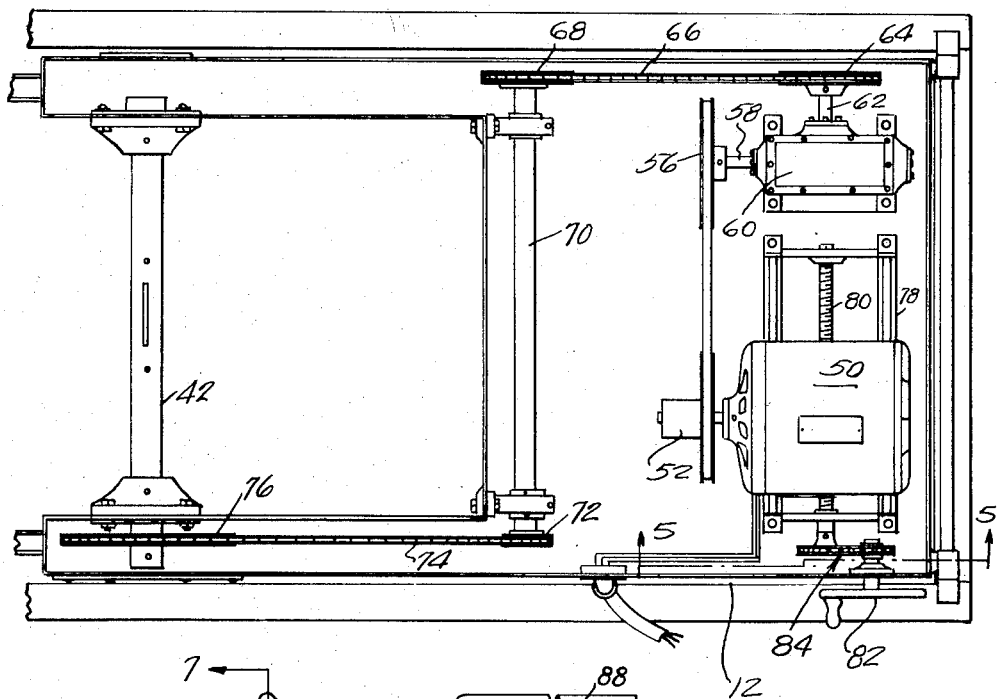
FIG. 6.
FIG. 7.
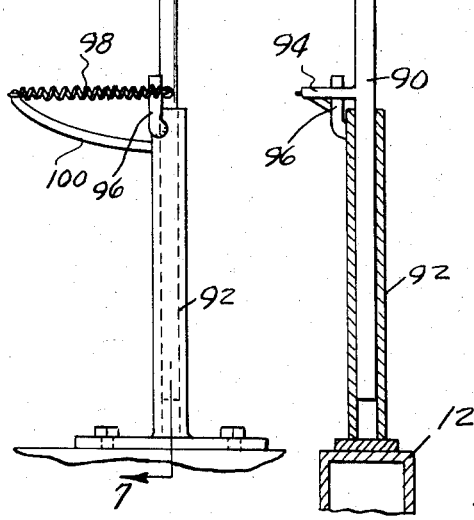
INVENTOR
Benjamin J. Boykin,
BY
McMorrow, Berman & Davidson
ATTORNEYS Feb. 24, 1959     B. J. BOYKIN     2,874,402
FOWL DEHEADING APPARATUS Filed Jan. 3, 1958     4 Sheets-Sheet 4

INVENTOR
Benjamin J. Boykin,

BY
McMorrow, Berman & Davidson
ATTORNEY

United States Patent Office 2,874,402
Patented Feb. 24, 1959

2,874,402

FOWL DEHEADING APPARATUS

Benjamin J. Boykin, El Dorado, Ark.

Application January 3, 1958, Serial No. 706,954

3 Claims. (Cl. 17—12)

The present invention relates to an apparatus for deheading fowl for use in a poultry packing plant.

An object of the present invention is to provide a fowl deheading apparatus which is automatic in operation when installed in a poultry packing plant having an overhead conveyor for conveying fowl carcasses between defeathering and eviscerating operations.

Another object of the present invention is to provide a fowl deheading apparatus which is simple in structure, one sturdy in construction, one which may be adjusted to accommodate fowl of different sizes, and one which is highly efficient in action.

These and other objects and advantages of the present invention will be fully apparent from the following description when taken in conjunction with the annexed drawings, in which:

Figure 2 is a plan view of the assembly shown in Figure 1;

Figure 3 is an enlarged fragmentary view taken on the line 3—3 of Figure 2;

Figure 4 is an enlarged sectional view taken on the line 4—4 of Figure 1;

Figure 5 is a sectional view, on a reduced scale, taken on the line 5—5 of Figure 4;

Figure 6 is a fragmentary elevational view;

Figure 7 is a view taken on the line 7—7 of Figure 6;

Figure 1:
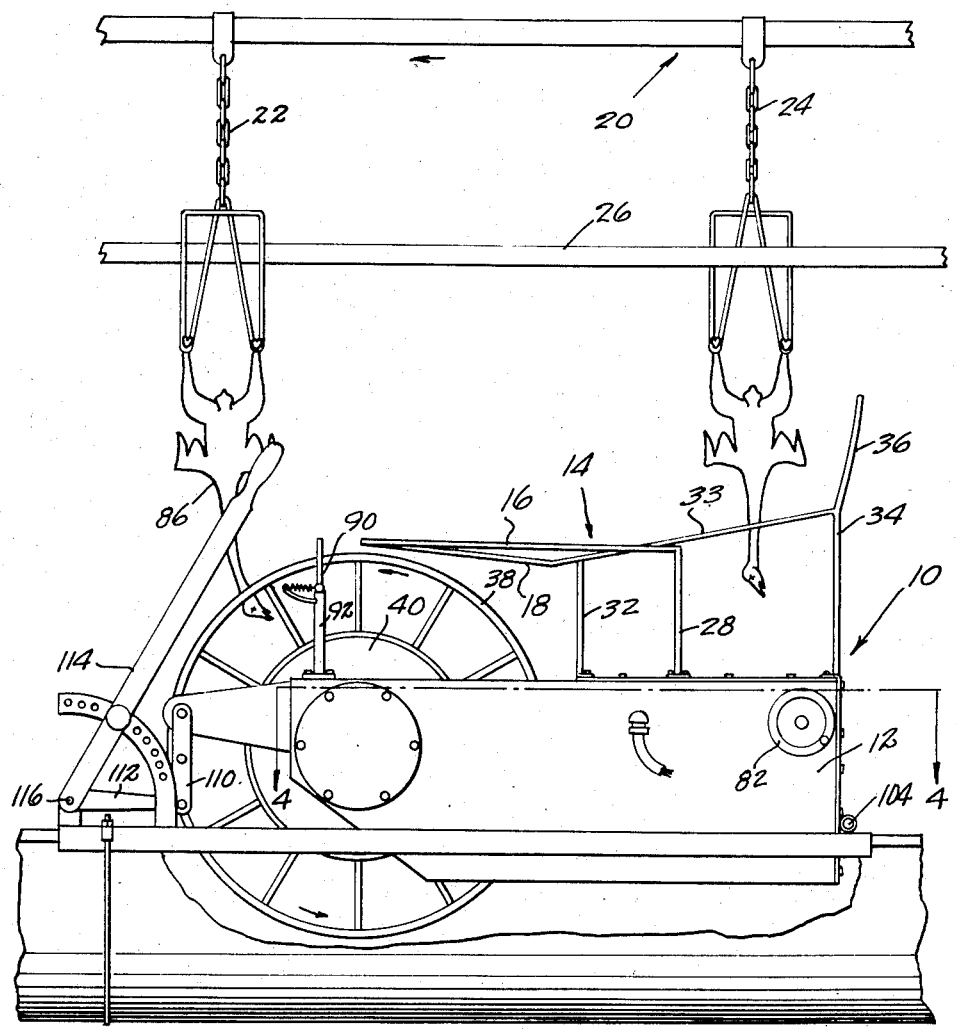
Figure 1 is a side elevational view of the apparatus, with parts broken away, according to the present invention.

Referring in greater detail to the drawings in which like numerals indicate like parts throughout the several views, the apparatus of the present invention is designated generally by the reference numeral 10 and includes a supporting structure 12 having a forward end and a rearward end. An upstanding guide frame, designated generally by the reference numeral 14, rises from the supporting structure 12 and extends from the forward end of the structure 12 to a point spaced from the rearward end. The guide frame 14 includes a pair of horizontally disposed rods 16 and 18 arranged in converging spaced relation, as shown in Figure 2 and positioned so that the diverging ends are adjacent to the forward end of the supporting structure 12 and the converging ends at the terminating point of the guide frame inwardly of and spaced from the rearward end of the structure 12.

As will be seen in Figure 2, there are two sets of rods 16 and 18 for the reason that the apparatus 10 is used with an overhead conveyor 20 or cable 20 which is positioned longitudinally of the supporting structure 12 and is movable in a linear path from the forward end of the structure 12 to the rearward end. The conveyor 20 has hanger members 22 and 24 positioned on opposite sides of a spreader bar 26 which serves to separate the alternate hanger members and to form two lines arranged in parallel relation. The rods 16 are formed integrally with and are attached to the upper ends of posts 28 which have their lower ends secured on the flat cover 30 of the structure 12. The ends of the rods 18 adjacent the forward end of the structure 12 are joined together and supported upon another post 32 and an upwardly sloping rod 33 extends from the joined ends of the rods 18 forwardly of the structure 12 to a terminating point connected with a further post 34 having an upwardly extending extension 36 on its upper end, the extension 36 serving to divide the two lines of the conveyor embodied by the cable 20 and the hanger members 22 and 24.

The components of the apparatus of the present invention are identical for each line of the conveyor with which they are employed and will be described with reference to only one set of components.

Figure 8:
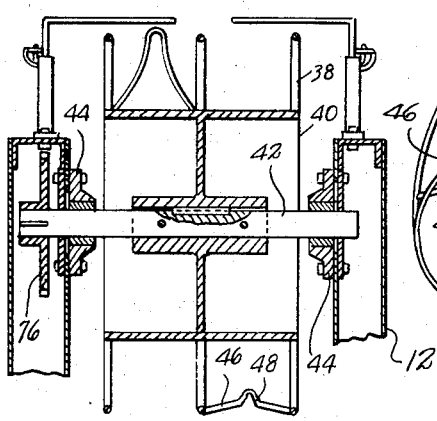
Figure 8 is a sectional view taken on the line 8—8 of Figure 2.
Figure 9:
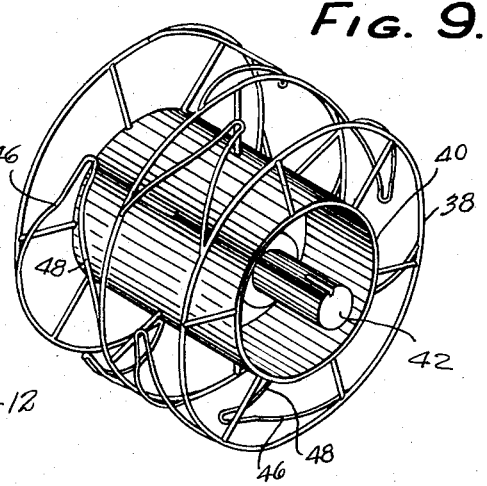
Figure 9 is a view of the cage of the present invention.
Figure 10:
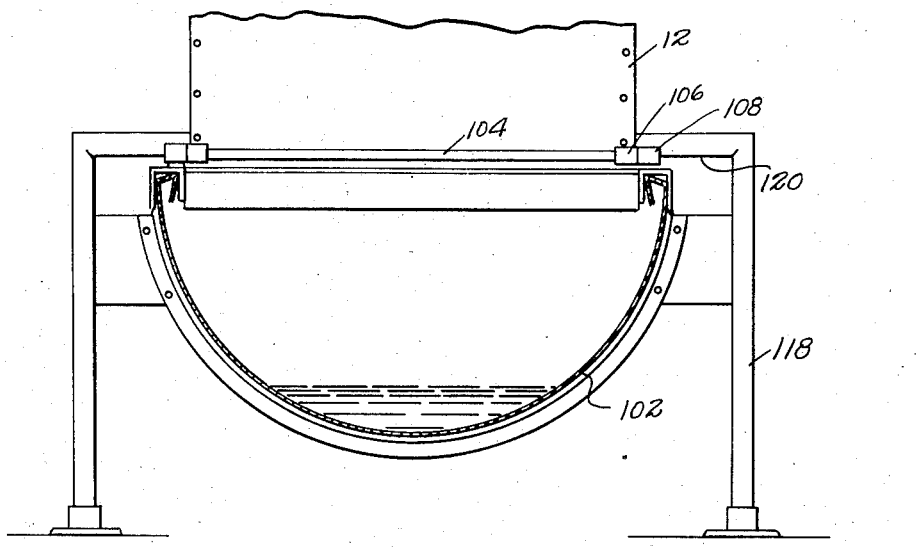
Figure 10 is a partial end view in elevation.

A horizontally disposed circular rotatable cage 38 is circumposed about a drum 40 which is keyed to a shaft 42. The shaft 42 has its ends journaled in bearing blocks 44, as shown in Figure 8, and is transversely of the supporting structure 12 inwardly of and adjacent the rearward end of the latter with the upper peripheral portion of the cage 38 contiguous to and below the converging ends of the rods 16 and 18.

A plurality of embracing elements are arranged in spaced relation about and carried by the periphery of the cage 38, each of such elements embodying a pair of wires 46 and 48 arranged in converging end to end relation with their ends abutting. The wires 46 and 48 are positioned so that the converging ends face toward the forward end of the supporting structure 12 with the diverging ends fixedly attached to the periphery of the cage 38.

Means is provided operatively connected to the cage 38 for rotating the cage 38 in a counterclockwise direction, as indicated by the arrows in Figure 1. This direction is in the same direction as the travel of the conveyor or cable 20 with reference to the upper peripheral portion of the cage 38. Specifically, this means for imparting rotation to the cage 38 consists in an electric motor 50 having a variable speed 52 on the driven shaft 54 thereof. As shown in Figure 4, the pulley 52 carries a belt to another pulley 56 on the end of the shaft 58 projecting from one end of a speed reducing housing 60. An output shaft 62 projects from one side of the housing 60 and carries a sprocket wheel 64 on the free end thereof. A chain 66 connects the sprocket wheel 64 with another sprocket wheel 68 which is mounted upon one end of a cross shaft 70. The other end of the cross shaft 70 carries another sprocket wheel 72 over which a chain 74 travels connecting the sprocket wheel 72 to a further sprocket wheel 76 which is keyed to one end of the shaft 42. The mounting for the motor 50 includes a laterally extending trackway 78 and a transversely arranged screw 80 journaled in the ends of the trackway 78 and operatively connected to the motor 50 for moving the latter transversely of the supporting structure 12 in response to actuation by hand actuable means or a hand wheel 82 which is operatively connected by means of appropriately arranged sprocket gears and chain assembly as at 84 in Figure 4 to the screw 80 for rotating the latter and shifting the motor 50 laterally. This effects the changing of the speed ratio of the variable speed pulley 52 in the conventional manner and results in slowing or speeding up of the rate of rotation of the shaft 42 in order that the circular movement of the cage 38 conforms to the speed of travel of the conveyor or table 20.

Each of the spaced hanger members 22 and 24 depend from the conveyor or cable 20 and each is adapted to dependingly support the carcass 86 of a fowl in a head-down position.

As shown in Figures 6, 7 and 8, a horizontally disposed yieldable bar 88 is positioned transversely of and above the upper periphery of the cage 38 outwardly of and spaced from the converging ends of the guide rods 16 and 18. The bar 88 embodies a short leg of an L-shaped member 90 having its long leg slidably and rotatably mounted within a hollow post 92 which has its lower end fixedly secured to a portion of the supporting structure 12. An arm 94 projects from the portion of the long leg of the member 90 immediately above the upper end of the post 92, the arm 94 being engageable with a stop 96 carried by the post 92 and arranged so that the bar 88 in its position of rest is transversely of the supporting structure 12. A spring 98 biases the member 90 to the position in which the bar 88 is transversely of the supporting structure 12. When the spring is connected to the arm 94 and the other end is connected to an extension 100 which projects from the post 92 inwardly of the upper end of the latter.

The bar 88 is normally in the transverse position and is shiftable from that position to a position longitudinally of the supporting structure 12 upon engagement of the head portion of a carcass of a fowl when the neck of the fowl is caught between the converging ends of the wires 46 and 48 which form a slot having one end open and of a size to restrain movement therethrough of the head of the carcass 86.

In operation, execution of movement of the cable 20 in its linear path as indicated by the arrow in Figure 1 causes the portion of the neck of the carcass 86 when the latter is supported in one of the hanger members 22 or 24 to travel in turn between and along the guide frame rods 16 and 18 from the diverging ends of the latter to and out of the converging ends with each carcass head portion being inserted in turn into the embracing elements constituting the wires 46 and 48 and carried by the wires 46 and 48 downwardly and away from the cable 20 upon the counterclockwise rotation of the cage 38. This results in separating the carcass head portion from the carcass usually carrying with it the windpipe and crop of the carcass and disposing same into a trough 102 which extends beneath the supporting structure 12, the trough 102 having water flowing through it for disposing of the head portions of the carcasses as they are severed from the carcasses.

Means is provided for shifting one end of the supporting structure 12, other end of the link member 110 or lower the upper peripheral portion of the cage 38 in order to accommodate shorter or longer fowls as desired. Specifically, this means consists in a transversely extending shaft 104 journaled in sleeves 106 on each side of the one end of the supporting structure 12 and having the portions adjacent each end rotatably mounted in trunnions 108 carried upon the frame of the trough 102. The rearward end of the supporting structure 12 is connected by a link member 110 on each side of the supporting structure 12, the other end of the link member 110 being connected to the free end of an arm 112 which is operatively connected to an operating handle 114. The arm 112 and handle 114 move together upon the application of a manually applied force to the handle 114 to raise or lower the arm 112 about a pivot point or pin 116 secured to the frame of the trough 102. It will be seen, therefore, that pulling back on the handle 114 will shift the structure 12 upwardly at the rearward end thereof and will raise the cage 38 from its position shown in full lines in Figure 3 to the dotted line position. Legs 118 and a cross member 120 support the trough 102 above a supporting surface.

In operation, the freshly killed carcasses 86 of the fowls being processed in the plant where the apparatus 10 is to be employed are hung and turned upon the hanger members 22 and 24 in succession and are carried over the apparatus 10 at a rate of speed consistent with the speed of rotation of the cage 38 so that the wires 46 and 48 receive between their converging ends the portion of the neck of the carcass adjacent the head and carries the same downwardly as the conveyor or cable 20 moves the carcass 86 along to a point where the head is severed by pulling from the carcass. The apparatus 10 of the present invention is efficient in operation and saves the labor formerly required to sever the heads of the carcasses, the operation of the apparatus being automatic and requiring little or no attention other than to speed up or slow the rate of rotation of the cage 38 to conform to the speed of travel of the conveyor or cable 20.

What is claimed is:

1. In a fowl deheading apparatus, a supporting structure having a forward end and a rearward end, an upstanding guide frame rising from said structure and extending from the forward end to a point spaced from the rearward end thereof, said guide frame including a pair of horizontally disposed rods arranged in converging spaced relation positioned so that the diverging ends are adjacent to the forward end of said structure with the converging ends at the terminating point of said guide frame, a horizontally disposed circular rotatable cage carried by said structure and extending transversely of said structure inwardly of and adjacent the rearward end thereof with the upper peripheral portion contiguous to and below the converging ends of said rods, a plurality of embracing elements arranged in spaced relation about and carried by the periphery of said cage, means operatively connected to said cage for rotating the latter in a counterclockwise direction, and overhead horizontally disposed cable positioned longitudinally of said structure and movable in a linear path from the forward end to the rearward end of said structure, and a plurality of spaced hanger members depending from said cable, each of said hanger members being adapted to dependingly support a fowl carcass in a head down position, said cable upon execution of its movement in said linear path causing the head down portions of the fowl carcasses when supported on said hanger members to travel in turn between and along the guide frame rods from the diverging ends to and out of the converging ends with each carcass head portion being inserted into the embracing elements adjacent the guide frame converging ends and be carried by said embracing elements downwardly and away from said cable by the counterclockwise rotation of said cage to separate the carcass head portion from the carcass.

2. In a fowl deheading apparatus, a supporting structure having a forward end and a rearward end, an upstanding guide frame rising from said structure and extending from the forward end to a point spaced from the rearward end thereof, said guide frame including a pair of horizontally disposed rods arranged in converging spaced relation positioned so that the diverging ends are adjacent to the forward end of said structure with the converging ends at the terminating point of said guide frame, a horizontally disposed circular rotatable cage carried by said structure and extending transversely of said structure inwardly of and adjacent the rearward end thereof with the upper peripheral portion contiguous to and below the converging ends of said rods, a plurality of embracing elements arranged in spaced relation about and carried by the periphery of said cage, each of said embracing elements embodying a pair of wires arranged in converging end to end abutting relation and positioned so that the converging ends face toward the forward end of said structure with the diverging ends fixedly attached to the periphery of said cage, means operatively connected to said cage for rotating the latter in a counterclockwise direction, an overhead horizontally disposed cable positioned longitudinally of said structure and movable in a linear path from the forward end to the rearward end of said structure, and a plurality of spaced hanger members depending from said cable, each of said hanger members being adapted to dependingly support a fowl carcass in a head down position, said cable upon execution of its movement in said linear path causing the head down portions of the fowl carcasses when supported on said hanger members to travel in turn between and along the guide frame rods from the diverging ends to and out of the converging ends with each carcass head portion being inserted into the embracing elements adjacent the guide frame converging ends and be carried by said embracing elements downwardly and away from said cable by the counterclockwise rotation of said cage to separate the carcass head portion from the carcass.

3. In a fowl deheating apparatus, a supporting structure having a forward end and a rearward end, an upstanding guide frame rising from said structure and extending from the forward end to a point spaced from the rearward end thereof, said guide frame including a pair of horizontally disposed rods arranged in converging spaced relation positioned so that the diverging ends are adjacent to the forward end of said structure with the converging ends at the terminating point of said guide frame, a horizontally disposed circular rotatable cage carried by said structure and extending transversely of said structure inwardly of and adjacent the rearward end thereof with the upper peripheral portion contiguous to and below the converging ends of said rods, a plurality of embracing elements arranged in spaced relation about and carried by the periphery of said cage, means operatively connected to said cage for rotating the latter in a counterclockwise direction, an overhead horizontally disposed cable positioned longitudinally of said structure and movable in a linear path from the forward end to the rearward end of said structure, a plurality of spaced hanger members depending from said cable, each of said hanger members being adapted to dependingly support a fowl carcass in a head down position, said cable upon execution of its movement in said linear path causing the head down portions of the fowl carcasses when supported on said hanger members to travel in turn between and along the guide frame rods from the diverging ends to and out of the converging ends with each carcass head portion being inserted into the embracing elements adjacent the guide frame converging ends and be carried by said embracing elements downwardly and away from said cable by the counterclockwise rotation of said cage to separate the carcass head portion from the carcass, and a horizontally disposed yieldable bar positioned transversely of and above the upper peripheral portion of said cage outwardly of and spaced from the converging ends of said guide frame rods and carried by said structure, said bar being shiftable from the transverse position to a position longitudinally of said structure responsive to engagement by a carcass head portion when inserted in an embracing element.

No references cited.